(12) United States Patent
Kitagawa

(10) Patent No.: US 12,388,804 B2
(45) Date of Patent: *Aug. 12, 2025

(54) CRYPTOSYSTEM AND CRYPTOGRAPHIC SERVICE METHODS

(71) Applicant: RENESAS ELECTRONICS CORPORATION, Tokyo (JP)

(72) Inventor: Takashi Kitagawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 18/319,674

(22) Filed: May 18, 2023

(65) Prior Publication Data

US 2024/0007281 A1    Jan. 4, 2024

(30) Foreign Application Priority Data

Jun. 30, 2022  (JP) ................................. 2022-106282

(51) Int. Cl.
  *H04L 9/40*  (2022.01)
  *H04L 9/08*  (2006.01)
  (Continued)

(52) U.S. Cl.
  CPC ........ *H04L 63/0442* (2013.01); *H04L 9/0866* (2013.01); *H04L 9/088* (2013.01);
  (Continued)

(58) Field of Classification Search
  CPC ................. H04L 63/06; H04L 63/0638; H04L 63/061; H04L 63/04; H04L 63/0428;
  (Continued)

(56) References Cited

U.S. PATENT DOCUMENTS 9,397,828 B1 *    7/2016  Lieber ...................... G09C 1/00
2009/0217054 A1 *  8/2009  Haider .................. H04L 9/3247
                                       713/189

(Continued)

FOREIGN PATENT DOCUMENTS

JP    2022-040957 A    3/2022

*Primary Examiner* — Shaqueal D Wade-Wright
(74) *Attorney, Agent, or Firm* — Rimon P.C.

(57) ABSTRACT

A semiconductor manufacturer generates a manufacturer encryption key and a manufacturer decryption key corresponding to the manufacturer decryption key, installs the manufacturer decryption key in a semiconductor device, and provides a customer with the manufacturer decryption key, the customer generates a customer encryption key and a customer decryption key corresponding to the customer decryption key, decrypts, by the customer decryption key, a customer key to be installed in the semiconductor device, and supplies the encrypted customer key to the semiconductor manufacturer, the semiconductor manufacturer encrypts the supplied customer key by the manufacturer encryption key without decryption, and supplies the encrypted customer key to the customer, the customer decrypts the customer key by the customer decryption key, and installs the decrypted customer key in the semiconductor device, and in the semiconductor device, the installed customer key is decrypted by the manufacturer decryption key installed by the semiconductor manufacturer.

8 Claims, 8 Drawing Sheets

(51) Int. Cl.
*H04L 9/14* (2006.01)
*H04L 9/30* (2006.01)

(52) U.S. Cl.
CPC .............. *H04L 9/14* (2013.01); *H04L 9/3066* (2013.01); *H04L 9/0825* (2013.01); *H04L 9/0861* (2013.01); *H04L 63/061* (2013.01)

(58) Field of Classification Search
CPC .............. H04L 63/0442; H04L 63/045; H04L 63/0478; H04L 9/08; H04L 9/0816; H04L 9/0861; H04L 9/0863; H04L 9/0838; H04L 9/0866; H04L 9/088; H04L 9/0825; H04L 9/30; H04L 9/3025; H04L 9/14; G06F 21/60; G06F 21/602; G06F 21/70; G06F 21/72
See application file for complete search history.

(56) References Cited

U.S. PATENT DOCUMENTS

| | | | |
|---|---|---|---|
| 2010/0189265 A1* | 7/2010 | Ito | H04L 9/083 380/278 |
| 2010/0215179 A1* | 8/2010 | Atwood | H04L 9/0891 380/278 |
| 2014/0149748 A1* | 5/2014 | Ang | G06F 21/57 713/189 |
| 2015/0113278 A1* | 4/2015 | Cocchi | H04L 63/0853 713/171 |
| 2018/0097622 A1* | 4/2018 | Kurokawa | H04W 4/60 |
| 2022/0069983 A1 | 3/2022 | Yoshida et al. | |

* cited by examiner

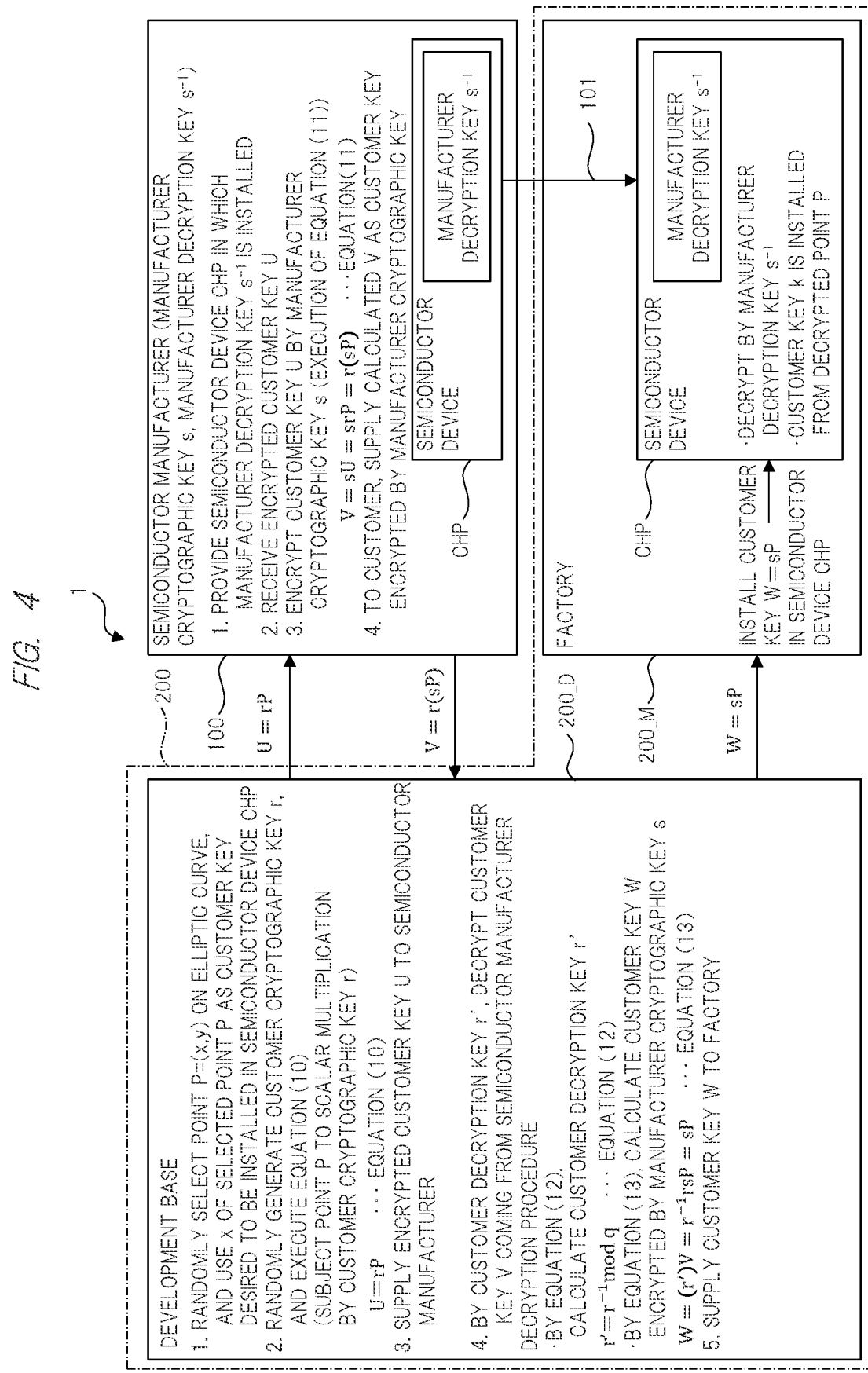

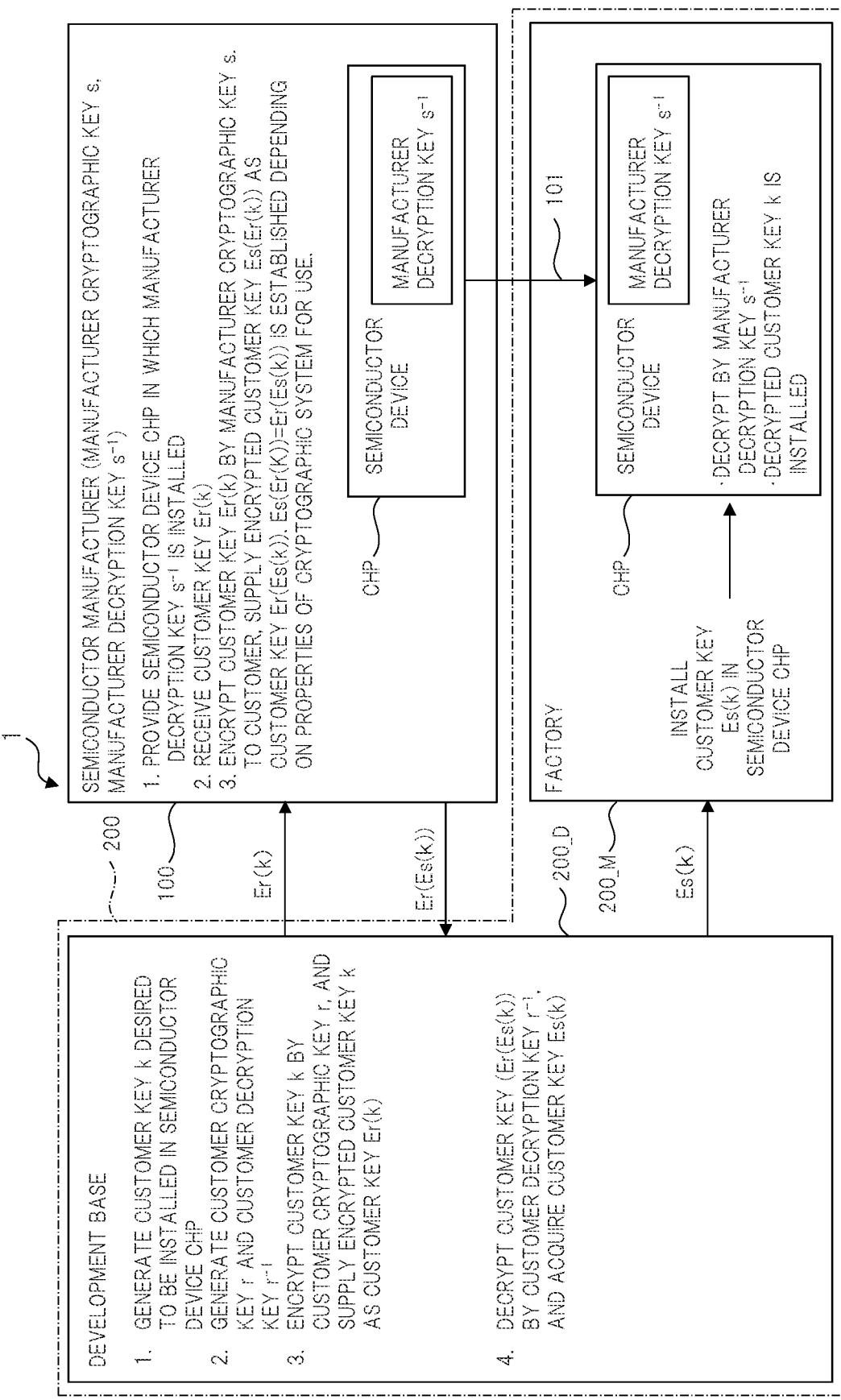

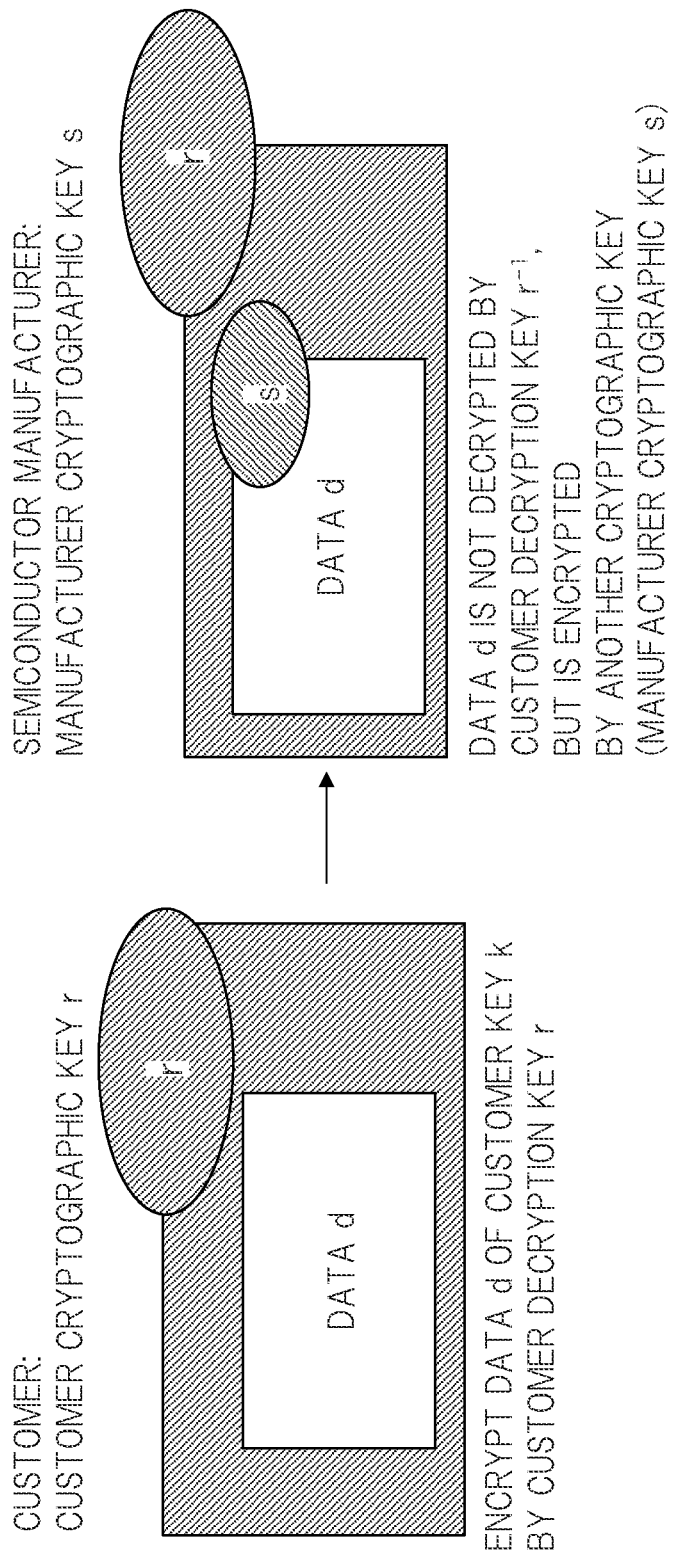

FIG. 7

DATA: d
CRYPTOGRAPHIC KEY: r, DECRYPTION KEY: r'
PARAMETER p (HUGE PRIME NUMBER) FOR USE IN CRYPTOGRAM

CUSTOMER ENCRYPTION:
$c = d^r \bmod p$   (mod p INDICATES REMAINDER AS RESULT OF DIVISION BY p)
    $\cdots$ EQUATION (1)
CUSTOMER DECRYPTION:
$r' = r^{-1} \bmod (p-1)$          $\cdots$ EQUATION (2)
$d = c^{r'} \bmod p$               $\cdots$ EQUATION (3)

REASON WHY ORDER OF ENCRYPTION CAN BE CHANGED:

WHEN ENCRYPTION IS PERFORMED BY CRYPTOGRAPHIC KEY s AFTER ENCRYPTION IS PERFORMED BY CRYPTOGRAPHIC KEY r,
$c_1 = c^s \bmod p = d^{rs} \bmod p = (d^s)^r \bmod p$          $\cdots$ EQUATION (4)

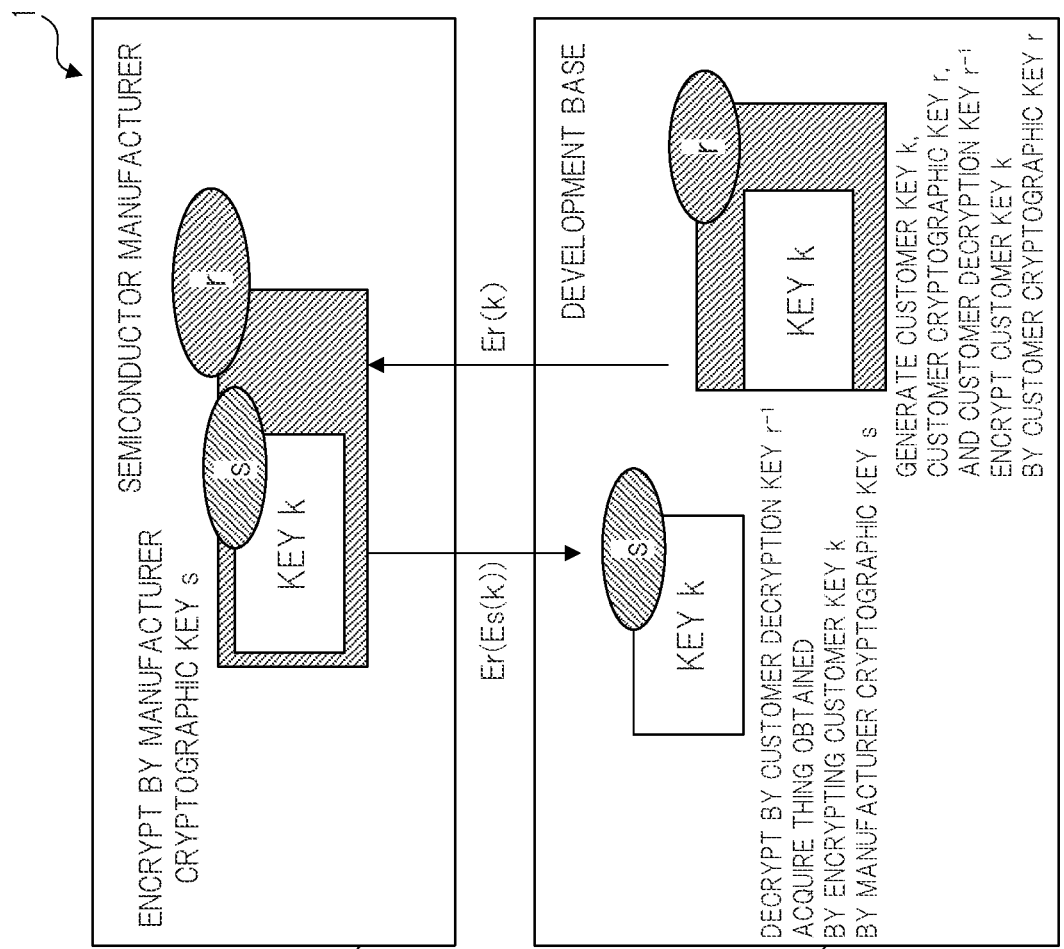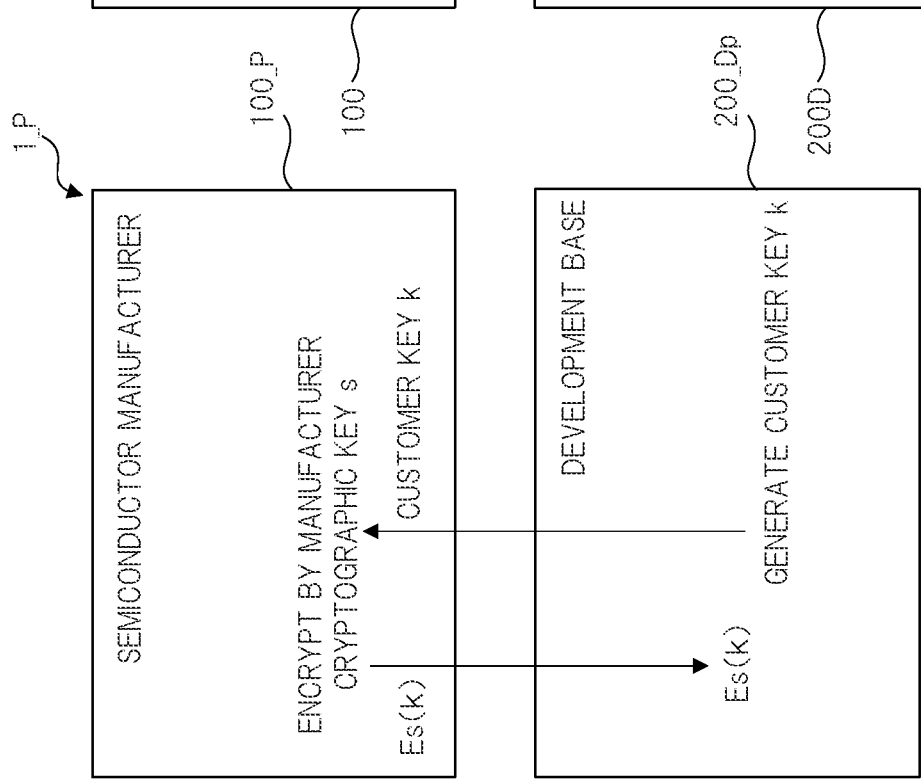

CRYPTOSYSTEM AND CRYPTOGRAPHIC SERVICE METHODS

CROSS-REFERENCE TO RELATED APPLICATIONS

The disclosure of Japanese Patent Application No. 2022-106282 filed on Jun. 30, 2022 including the specification, drawings and abstract is incorporated herein by reference in its entirety.

BACKGROUND

The present invention relates to a cryptosystem and cryptographic service methods, and for example, relates to a cryptosystem and cryptographic service methods for installing, in a semiconductor device, a key of a user that uses the semiconductor device.

A user (hereinafter, also referred to as a customer or a user side) that uses a semiconductor device provides a product user with a customer product that incorporates the semiconductor device therein. In this case, the customer sometimes provides the product user with a variety of services. In order to provide the product user with the variety of services, the customer sometimes installs a key of the customer (hereinafter, also referred to as a customer key) in the semiconductor device to be incorporated. For example, the customer provides the product user with the services by a communication encrypted so as to be capable of being decrypted by the customer key. As a result, the services will be provided only to a customer product in which an appropriate customer key is installed.

There is disclosed a technique listed below.
[Patent Document 1] Japanese Unexamined Patent Application Publication No. 2022-40957

For example, Patent Document 1 describes a system that manages an encryption key.

SUMMARY

For example, the customer includes a development base where the customer product is developed, and manufacturing bases (hereinafter, also referred to as factories) where the product developed in the development base is actually manufactured. The factories are located not only domestically but also abroad frequently. It is concerned that there are factories where such customer keys cannot be managed sufficiently, and leakage of the customer keys is concerned.

For example, in order to prevent leakage of the customer key from such a factory, there is a cryptosystem in which a provider (hereinafter, also referred to as a semiconductor manufacturer or a provider side) that provides a customer with a semiconductor device generates a provider-side encryption key (hereinafter, also referred to as a first encryption key) and a decryption key (hereinafter, also referred to as a first decryption key) for decrypting the encryption key, and encrypts and decrypts the customer key by using the first encryption key and the first decryption key.

In this cryptosystem, the semiconductor manufacturer installs the first decryption key in advance in the semiconductor device, and provides the customer therewith. This semiconductor device includes a decryption functional unit that, when the customer key encrypted by the first encryption key is installed, decrypts the encrypted customer key by the first decryption key installed in advance. In this case, the customer key is suppled from the customer to the semiconductor manufacturer, and is encrypted by the first encryption key in the semiconductor manufacturer. Then, the customer key encrypted by the first encryption key is supplied from the semiconductor manufacturer to the customer.

In the factory, the customer installs the customer key, which is encrypted by the first encryption key, in the semiconductor device. In the semiconductor device, the encrypted customer key is decoded by the first decryption key installed in advance, and the customer key that is not encrypted is installed in the semiconductor device.

The cryptosystem described above is adopted, so that the customer key handled in the factory is encrypted by the first encryption key, and therefore, it becomes possible to prevent the customer key from being leaked.

However, after reviewing the cryptosystem described above, the inventor of the present invention noticed that the cryptosystem had such a problem as described below. That is, the customer needs to supply the customer key to the semiconductor manufacturer. It is considered that a customer that requires high security is concerned that the customer key is supplied to the semiconductor manufacturer. Moreover, since the semiconductor manufacturer supplied with the customer key is required to manage the customer key with high security, cost is considered to increase.

Patent Document 1 does not disclose the cryptosystem described above. As a matter of course, Patent Document 1 does not describe or suggest the above-described problem noticed by the inventor of the present invention.

Outlines of representatives in embodiments disclosed in the present application will be briefly described below.

That is, a cryptosystem includes a provider side that provides a semiconductor device, and a user side that uses the semiconductor device. Herein, the provider side generates a first encryption key, and a first decryption key for decrypting a thing encrypted by the first encryption key, installs the first decryption key in the semiconductor device, and generates the first decryption key to the user side. The user side generates a second encryption key different from the first encryption key, and a second decryption key for decrypting the thing encrypted by the second encryption key, encrypts, by the second encryption key, a customer key to be installed in the semiconductor device, and supplies the encrypted customer key to the provider side. The provider side encrypts the supplied customer key by the first encryption key without decryption, and supplies, to the user side, the customer key encrypted by the first encryption key, and the user side decrypts the supplied customer key by the second decryption key, and installs the decrypted customer key in the semiconductor device. In the semiconductor device, the installed customer key is decrypted by the first decryption key installed by the provider side.

Other objects and novel features will be apparent from the description in the specification and the accompanying drawings.

In accordance with an embodiment, it becomes possible to provide a high-security cryptosystem capable of suppressing an increase of cost.

BRIEF DESCRIPTION OF THE DRAWINGS

FIG. 4 is a block diagram showing a cryptosystem according to a second embodiment.

FIG. 5 is a diagram for explaining an outline of an embodiment.

FIG. 6 is a diagram for explaining the outline of the embodiment.

FIG. 7 is a diagram for explaining the outline of the embodiment.

FIGS. 8A and 8B are diagrams for explaining the outline of the embodiment.

DETAILED DESCRIPTION

Figure 1:
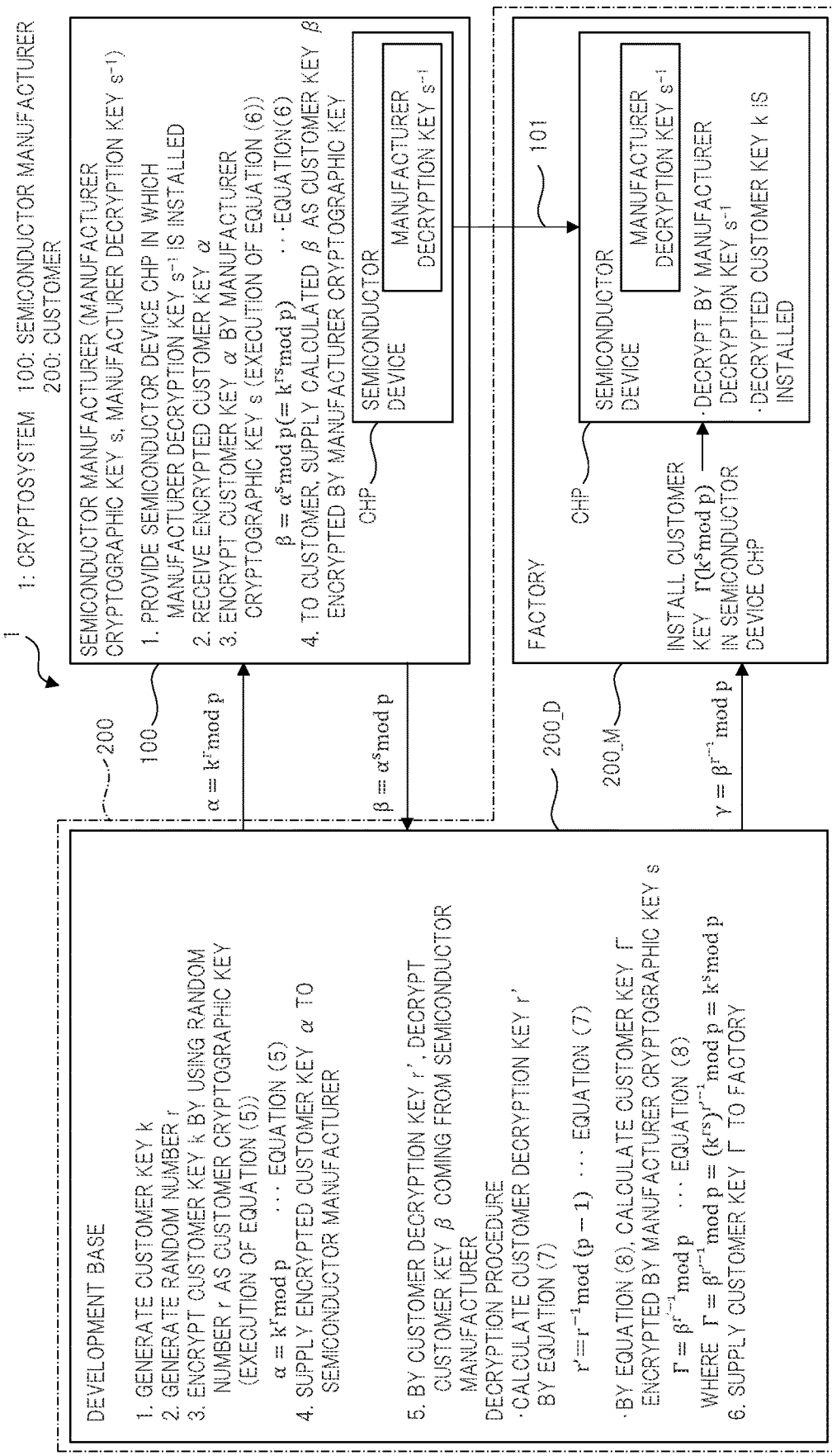
FIG. 1 is a block diagram showing a cryptosystem according to a first embodiment.

Hereinafter, a description will be given of respective embodiment of the present invention with reference to the drawings. Note that the disclosure is merely an example, and appropriate changes of the invention, which maintain the spirit thereof and are easily conceivable by those skilled in the art, are naturally included in the scope of the present invention.

Moreover, in some cases, in the present specification and the respective drawings, the same reference numerals are assigned to elements similar to those mentioned above regarding the already-discussed drawings, and a detailed description thereof is omitted as appropriate.

OUTLINE OF EMBODIMENTS

A plurality of embodiments will be described below. In order to facilitate the understanding, outlines of a cryptosystem and cryptographic service methods according to the embodiments will be described first. Note that the cryptographic service methods can be regarded as a business model between a semiconductor manufacturer and a customer thereof. Adoption of this business model makes it possible to install a customer key in a semiconductor device while reducing a risk of leakage of the customer key and suppressing an increase of cost.

FIGS. 5 to 8 are diagrams for explaining the outline of the embodiment.

In FIG. 5, reference numeral 1 denotes a cryptosystem. The cryptosystem 1 includes a semiconductor manufacturer 100 that provides a semiconductor device, and a customer 200 that provides a product (customer product) using the provided semiconductor device. FIG. 5 shows an example in which the customer 200 includes a development base 200_D and a factory 200_M that manufactures a product developed in the development base 200_D. Herein, the description will be given on the assumption that the development base 200_D is located domestically, and that the factory 200_M is located abroad.

Step 1 of Semiconductor Manufacturer

The semiconductor manufacturer 100 generates an encryption key (hereinafter, also referred to as a manufacturer encryption key or a first encryption key; described as the manufacturer cryptographic key in the following drawings) s for encrypting a customer key k, and a decryption key (hereinafter, also referred to as a manufacturer decryption key or a first decryption key) s−1 for decrypting the customer key k encrypted by the manufacturer encryption key s. That is, the semiconductor manufacturer 100 generates the manufacturer encryption key s and the manufacturer decryption key s−1 corresponding to the manufacturer encryption key s.

The semiconductor manufacturer 100 sells a semiconductor device CHP in which the manufacturer decryption key s−1 is installed, thereby providing the customer 200 therewith. In FIG. 5, the semiconductor device CHP is provided to the factory 200_M of the customer. As a matter of course, destinations to which the semiconductor device CHP is provided is not limited to the factory 200_M.

Herein, a detailed description of the semiconductor device CHP to be provided is omitted since an example of a configuration of the semiconductor device CHP will be described later with reference to FIG. 2. Basically, the semiconductor device CHP includes a decryption functional unit that decrypts the customer key k, which is encrypted by the manufacturer encryption key s, by using the manufacturer decryption key s−1 installed in advance, and installs the decrypted customer key k.

Steps 1, 2 and 3 of Customer

In the development base 200_D, the customer 200 generates the customer key k installed in the semiconductor device CHP.

In the development base 200_D, the customer 200 develops the customer product using the semiconductor device CHP. In the development of the customer product, the customer 200 sets, as a specification of the customer product, such a specification in which a communication between this product and for example, a server of the customer 200 is encrypted by using, as an encryption key, the customer key k installed in the semiconductor device CHP.

Next, the customer 200 generates a customer encryption key (second encryption key; described as a customer cryptographic key in the following drawings) r for encrypting the customer key k, and a customer decryption key (second decryption key) r−1 for decrypting the customer key k encrypted by the customer encryption key r. That is, the customer decryption key r−1 is a decryption key corresponding to the customer encryption key r.

Moreover, the customer 200 encrypts the customer key k by the customer encryption key r. In FIG. 5, the customer key encrypted by the customer encryption key r is denoted as reference symbol Er(k). For example, via a network, the customer 200 supplies the encrypted customer key Er(k) to the semiconductor manufacturer 100.

Steps 2 and 3 of Semiconductor Manufacturer

The semiconductor manufacturer 100 receives the customer key Er(k) via the network.

Next, the semiconductor manufacturer 100 encrypts the customer key Er(k) by the manufacturer encryption key s. A customer key obtained by encrypting, by the manufacturer encryption key s, the customer key Er(k) encrypted by the customer encryption key r is denoted as reference symbol Es(Er(k)) in FIG. 5. In the embodiment, it is made possible to change an order of the encryption depending on properties of a cryptographic system for use.

That is, as shown in FIG. 5, the customer key Es(Er(k)) obtained by encrypting, by the manufacturer encryption key s, the customer key Er(k) encrypted by the customer encryption key r can be further changed to a customer key Er(Es(k)) encrypted by the customer encryption key r. The customer key is set to the customer key Er(Es(k)) by this change, so that, as shown in FIG. 6, without decryption by the customer decryption key r−1, data d that constitutes the customer key k can be encrypted by the manufacturer encryption key s, and can be further encrypted by the customer encryption key r.

Via the network, the semiconductor manufacturer 100 supplies the encrypted customer key Er(Es(k)) to the customer 200. In the example shown in FIG. 5, the encrypted customer key Er(Es(k)) is supplied to the development base 200_D of the customer.

Step 4 of Customer

For example, in the development base 200_D, the customer 200 decodes, by the customer decryption key r−1, the customer key Er(Es(k)) supplied via the network. By the decoding, the customer 200 acquires the customer key Es(k) encrypted by the manufacturer encryption key s.

For example, via the network, the customer key Es(k) encrypted by the manufacturer encryption key s is supplied from the development base 200_D to the factory 200_M located abroad.

In the factory 200_M, the customer key Es(k) encrypted by the manufacturer encryption key s is installed in the semiconductor device CHP without being decrypted by the manufacturer decryption key s−1. Since the manufacturer decryption key s−1 is installed in advance in the semiconductor device CHP, the decryption functional unit in the semiconductor device CHP decrypts the encrypted customer key Es(k) by using the manufacturer decryption key s−1, so that the undecrypted customer key k is acquired, and is installed in the semiconductor device CHP.

Example of Cryptographic System

An example of the cryptographic system for use will be described with reference to FIG. 7.

The cryptographic system described herein encrypts the data (or message) d of the customer key k by using the customer encryption key r and a parameter p that is a huge prime number. It is assumed that, in this cryptographic system, the parameter p is shared between the customer 200 and the semiconductor manufacturer 100 so as to be recognizable by both.

The encryption of the data d by the customer encryption key r and the parameter p is performed by Equation (1). In Equation (1), mod p indicates a remainder as a result of a division by the parameter p. By executing Equation (1), the data d is encrypted by the customer encryption key r, and encrypted data c is obtained.

In the cryptographic system of FIG. 7, a customer decryption key r' corresponding to the customer encryption key r is calculated by the customer encryption key r and the parameter p as shown in Equation (2). In this case, as shown in Equation (3), an arithmetic operation is performed for the already encrypted data c by using the customer decryption key r' and the parameter p, so that the data c can be decrypted to obtain original data d.

Next, a description will be given of the reason why the order of the encryption can be changed. When the data d is encrypted by the manufacturer encryption key s after being encrypted by the customer encryption key r, then in data cl after the encryption, a multiplier for the data d becomes a product of the customer encryption key r and the manufacturer encryption key s as shown in Equation (4). Since the multiplier is a product, it becomes possible to change the order of the customer encryption key r and the manufacturer encryption key s as shown in Equation (4).

As a result, the arithmetic operation shown in Equation (3) is executed for the already encrypted data cl by using the customer decryption key r', so that not the data d of the customer key but the data d encrypted by the manufacturer encryption key s can be calculated.

Next, referring to FIG. 8, a description will be given of a comparison between the cryptosystem studied earlier in the section of summary by the inventor of the present invention and the cryptosystem 1 described with reference to FIG. 5. FIG. 8A is a diagram showing an outline of such a cryptosystem 1_P studied earlier, and FIG. 8B is a diagram showing an outline of the cryptosystem 1.

In the cryptosystem 1_P, the customer key k is generated in a development base 200_Dp of the customer, and is supplied to a semiconductor manufacturer 100_P. In the semiconductor manufacturer 100_P, the customer key k is encrypted by the manufacturer encryption key s, and the encrypted customer key Es(k) is supplied from the semiconductor manufacturer 100_P to the development base 200_Dp.

The customer key Es(k) encrypted by the manufacturer encryption key s is supplied from the development base 200_Dp to a factory (not shown) of the customer. In the factory of the customer, the customer key Es(k) is installed in the semiconductor device CHP in which the manufacturer decryption key s−1 is installed in advance. The decryption functional unit provided in the semiconductor device CHP decrypts the customer key Es(k) by using the manufacturer decryption key s−1, so that the customer key k is installed in the semiconductor device CHP. In accordance with the cryptosystem 1_P of FIG. 8A, since the customer key k supplied from the development base 200_Dp to the factory is encrypted, it is possible to prevent the customer key k from being leaked.

However, as shown in FIG. 8A, since the customer needs to supply the generated customer key k to the semiconductor manufacturer, such a customer that requires high security is sometimes concerned that the customer key k is supplied to the semiconductor manufacturer as mentioned in the section of summary. Moreover, in the semiconductor manufacturer 100_P, cost increases since the customer key k is managed.

In contrast, in the cryptosystem 1, as shown in FIG. 8B, the customer just needs to supply the customer key Er(k), which is encrypted by the customer encryption key r, to the semiconductor manufacturer 100. Moreover, the customer 200 does not need to supply the customer decryption key r−1, which corresponds to the customer encryption key r, to the semiconductor manufacturer 100, either. Hence, the customer that requires high security also becomes capable of supplying the customer key safely to the semiconductor manufacturer 100.

Meanwhile, in the semiconductor manufacturer 100, the customer key Er(k) encrypted by the customer encryption key r does not need to be decrypted. Moreover, since the customer decryption key r−1 for the decryption is not required, either, it becomes easy to manage the customer key, and it is possible to suppress the increase of cost related to the management. That is, in terms of business, benefits arise in both of the semiconductor manufacturer and the customer thereof.

Next, a description will be given of a plurality of embodiments which adopt cryptographic systems different from each other.

First Embodiment

FIG. 1 is a block diagram showing a cryptosystem according to a first embodiment. Since FIG. 1 is similar to FIG. 5, differences of FIG. 1 from FIG. 5 will be mainly described.

In the cryptosystem 1 according to the first embodiment, a random number r is used as the customer encryption key that encrypts the customer key k. Moreover, the prime number p is also used at the time of encrypting and decrypting the customer key k. It is assumed that this prime number p is shared between the customer 200 and the semiconductor manufacturer 100 so as to be recognizable by both.

The semiconductor manufacturer 100 generates the manufacturer encryption key s and the manufacturer decryption key s−1 corresponding thereto, installs the manufacdecryption key s-1 in the semiconductor device CHP, and by selling for example, provides the customer 200 with the semiconductor device CHP in which the manufacturer decryption key s-1 is installed in advance.

The customer 200 encrypts the customer key k by the customer encryption key r in the development base 200_D. This encryption is performed, for example, in such a manner that a computer (not shown) placed in the development base 200_D executes Equation (5) shown in FIG. 1. α calculated by the execution of Equation (5) is supplied as an encrypted customer key to the semiconductor manufacturer 100, for example, via a network.

In the semiconductor manufacturer 100, the customer key α is encrypted by the manufacturer encryption key s. This encryption is performed, for example, in such a manner that a computer (not shown) placed in the semiconductor manufacturer 100 executes Equation (6) shown in FIG. 1. By the execution of Equation (6), a customer key β encrypted by the customer encryption key r and the manufacturer encryption key s is calculated. The customer key β is supplied to the development base 200_D of the customer via the network. As shown in Equation (6), in the encryption, a product of the manufacturer encryption key s and the customer encryption key r becomes a multiplier of the customer key k, and accordingly, it is possible to change an order of the manufacturer encryption key s and the customer encryption key r.

By using a customer decryption key r', the customer 200 decrypts the customer key β coming from the semiconductor manufacturer 100. The customer decryption key r' for use in this decryption is calculated on the basis of the customer encryption key r and the prime number p in such a manner that the computer placed in the development base 200_D executes Equation (7) shown in FIG. 1. Moreover, the computer placed in the development base 200_D executes Equation (8) of FIG. 1 on the basis of the customer decryption key r' and the prime number p, thereby decrypting the customer key β, and calculating a customer key Γ encrypted by the manufacturer encryption key s. The calculated customer key Γ is supplied, for example, via the network to the factory 200_M located abroad.

In the factory 200_M, the supplied customer key Γ is installed to the semiconductor device CHP. In the semiconductor device CHP, the decryption functional unit decrypts the customer key Γ by the manufacturer decryption key s-1 installed in advance, obtains the customer key k, and installs the obtained customer key k in the semiconductor device CHP.

Configuration of Semiconductor Device

Referring to the drawing, a description will be given of an example of the semiconductor device CHP including the decryption functional unit that decrypts the customer key, which is encrypted by the manufacturer encryption key s, by using the manufacturer decryption key s-1 installed in advance.

Figure 2:
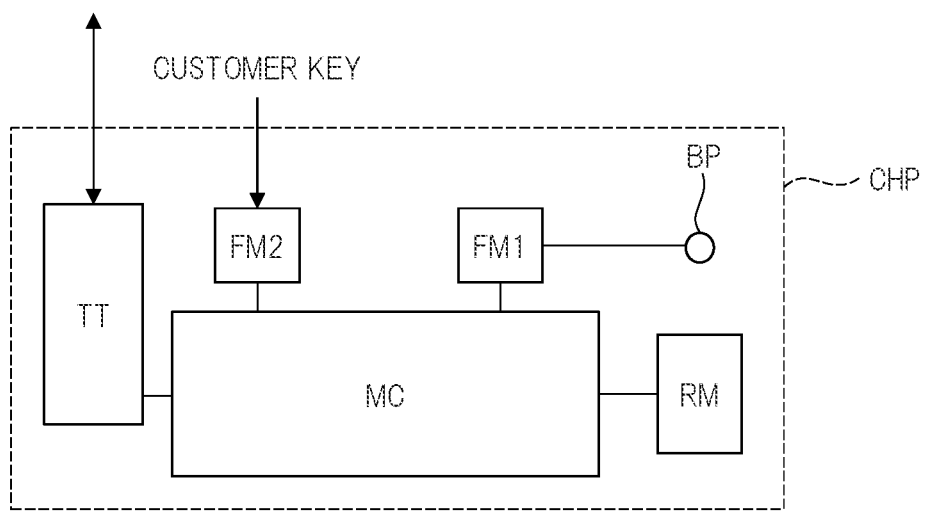
FIG. 2 is a block diagram showing a configuration of a semiconductor device according to the first embodiment.

FIG. 2 is a block diagram showing a configuration of the semiconductor device according to the first embodiment. Although the semiconductor device CHP includes a plurality of functional units, FIG. 2 only shows portions necessary to describe the first embodiment.

In FIG. 2, reference symbol MC denotes a processor (hereinafter, also referred to as a processing unit) that executes processing according to a program, and reference symbol RM denotes a nonvolatile memory in which the program to be executed by the processor MC is stored. Moreover, in FIG. 2, reference symbol FM1 denotes an electrically rewritable memory (hereinafter, also referred to as a flash memory or a first storage unit) into which the manufacturer decryption key s-1 is to be written, and reference symbol FM2 denotes an electrically rewritable memory (hereinafter, also referred to as a flash memory or a second storage unit) into which the encrypted customer key Γ is to be written. The manufacturer decryption key s-1 and the customer key Γ are written into the flash memories FM1 and FM2, so that the manufacturer decryption key s-1 and the customer key Γ are installed.

Although not particularly limited, in the semiconductor device CHP, the semiconductor manufacturer 100 writes the manufacturer decryption key s-1 into the flash memory FM1 via an electrode BP provided in the semiconductor device CHP, so that the manufacturer decryption key s-1 is installed. In contrast, the customer key Γ is written into the flash memory FM2 from the outside of the semiconductor device CHP, thereby being installed. Both of the manufacturer decryption key s-1 and the customer key Γ may be configured to be written into a flash memory common thereto; however, in order to prevent leakage, tampering and the like of the manufacturer decryption key s-1, it is desired that the separate flash memories FM1 and FM2 be prepared as shown in FIG. 2 and the manufacturer decryption key s-1 and the customer key Γ be written thereinto.

When the customer key Γ is installed, the processor MC reads out the manufacturer decryption key s-1 installed in advance and the installed customer key Γ from the flash memories FM1 and FM2 according to the program, and decrypts the customer key Γ by the manufacturer decryption key s-1. Moreover, the processor MC writes (installs) the decrypted customer key k, for example, into the flash memory FM2 according to the program.

The processor MC is also connected to a communication unit TT. When a cryptographic communication is performed via the communication unit TT, the processor MC performs the encryption and/or the decryption by using the customer key k installed in the flash memory FM2.

In FIG. 2, the decryption functional unit is composed of the program stored in the processor MC, the flash memories FM1 and FM2 and the nonvolatile memory RM; but is not limited to this. Moreover, the communication unit for use when the cryptographic communication is performed may be provided outside of the semiconductor device CHP.

Figure 3:
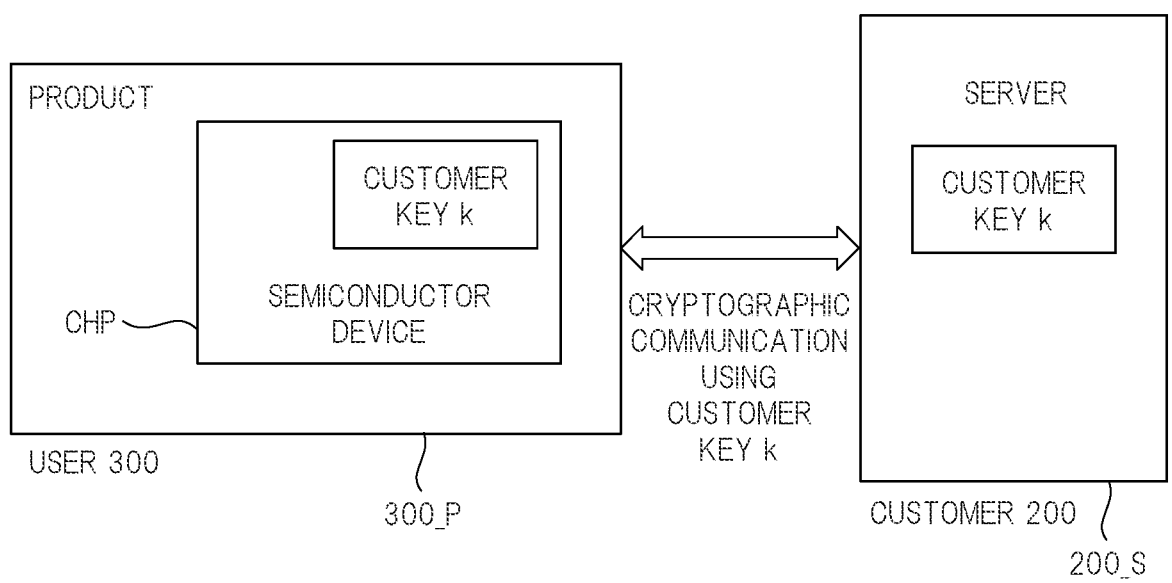
FIG. 3 is a diagram for explaining a system using a customer key installed by the cryptosystem according to the first embodiment.

FIG. 3 is a diagram for explaining a system using the customer key installed by the cryptosystem according to the first embodiment.

In FIG. 3, reference numeral 200_S denotes a server provided in the customer 200. Moreover, reference numeral 300_P denotes a customer product purchased from the customer 200 by a product user 300. In the customer product 300_P, incorporated is the semiconductor device CHP in which the customer key k is installed by the cryptosystem according to the first embodiment.

For example, for a service such as an upgrade of the customer product 300_P, the customer product 300-P and the server 200_S of the customer 200 are connected to each other via the network. At this time, the communication on the network is encrypted by using the customer key k. For example, the semiconductor device CHP decrypts the data, which is supplied via the network, by using the customer key k installed therein, and performs processing by using the decrypted data. Moreover, in the case of sending the data from the customer product 300_P to the server 200_S, then by using the customer key k, the semiconductor device CHP encrypts the data to be sent, followed by sending.

In the server 200_S also, the encryption and the decryption are performed by using the customer key k similarly. As a result, it becomes possible to provide the service only to the customer product in which the semiconductor device having the customer key k installed therein is incorporated.

Second Embodiment

FIG. 4 is a block diagram showing a cryptosystem according to a second embodiment. Since FIG. 4 is also similar to FIG. differences of FIG. 4 from FIG. 5 will be mainly described.

In the cryptosystem 1 according to the second embodiment, a system using an elliptic curve is adopted as a cryptographic system. That is, the customer selects, as a point related to the customer key, an arbitrary point P on a predetermined elliptic curve represented by the following Equation (9). More specifically, among coordinate data (x, y) which determine the point P, the customer selects coordinate data x as the customer key to be installed in the semiconductor device CHP. Note that, in Equation (9), a and b are parameters. It is assumed that the parameters a and b of the elliptic curve and a digit q of the elliptic curve are shared in advance between the customer 200 and the semiconductor manufacturer 100 so as to be recognizable by both.

$$y2=x3+ax+b \qquad \text{Equation (9)}$$

In the development base 200_D, the customer 200 randomly generates the customer encryption key r, and executes Equation (10) shown in FIG. 4 by using the customer encryption key r and the point P on the elliptic curve, thereby generating a customer key U encrypted by the customer encryption key r.

More specifically, the computer (not shown) placed in the development base 200_D executes Equation (10) shown in FIG. 4, so that the customer key U is generated. Note that, by the execution of Equation (10), the point P is subjected to scalar multiplication by the customer encryption key r. The encrypted customer key U is supplied to the semiconductor manufacturer 100 via the network.

As described in FIG. 4, the semiconductor manufacturer 100 provides the factory 200_M of the customer with the semiconductor device CHP in which the manufacturer decryption key s−1 is installed in advance (101). Upon receiving the customer key U, the semiconductor manufacturer 100 encrypts the customer key U by the manufacturer encryption key s. This encryption is performed in such a manner that the computer (not shown) placed in the semiconductor manufacturer 100 executes Equation (11) shown in FIG. 4. By the execution of Equation (11), the customer key U is subjected to scalar multiplication by the manufacturer encryption key s. That is, by the execution of Equation (11), on the point P, the manufacturer encryption key s and the customer encryption key r are subjected to scalar multiplication. Hence, as shown in Equation (11), it is possible to change the order of the manufacturer encryption key s and the customer encryption key r. A customer key V acquired by the execution of Equation (11) is supplied from the semiconductor manufacturer 100 to the development base 200_D of the customer via the network.

In the development base 200_D, the customer key V supplied from the semiconductor manufacturer 100 is decrypted. That is, first, the computer (not shown) placed in the development base 200_D executes Equation (12) shown in FIG. 4, thereby generating the customer decryption key r' corresponding to the customer encryption key r. Next, the computer executes Equation (13) shown in FIG. 4 by using the generated customer decryption key r' and the customer key V. Note that reference symbol q in Equation (12) is a digit of the above-described elliptic curve. By executing Equation (13), a customer key W decrypted by the customer decryption key r' and the encrypted by the manufacturer encryption key s is generated.

This customer key W is supplied via the network to the factory 200_M of the customer, which is located abroad. In the factory 200_M, the supplied customer key W is installed in the semiconductor device CHP without being decrypted by the manufacturer decryption key s−1. The decryption functional unit in the semiconductor device CHP decrypts the encrypted customer key W by using the manufacturer decryption key s−1. The unencrypted point P of the elliptical coordinate is acquired, and the coordinate x of the point P is installed as the customer encryption key in the semiconductor device CHP.

According to the embodiment, while preventing the leakage of the customer key, the customer that requires high security also becomes capable of supplying the customer key safely to the semiconductor manufacturer. Moreover, in the semiconductor manufacturer, it is possible to suppress the increase of the cost required for the management of the customer key.

In the embodiment, illustrated is the example of providing the customer 200 with the semiconductor device CHP in which the manufacturer decryption key is installed before receiving the customer key, but the present invention is not limited to this. For example, after the customer key encrypted by the manufacturer encryption key is supplied to the customer 200, the customer 200 may be provided with the semiconductor device CHP.

While the invention made by the inventor thereof has been specifically described on the basis of the embodiments thereof, needless to say, the present invention is not limited to the above-described embodiments, and is modifiable in various ways within the scope without departing from the spirit thereof.

What is claimed is:
1. A cryptosystem comprising:
a provider side configured to provide a semiconductor device; and
a user side configured to use the semiconductor device,
wherein the provider side generates a first encryption key, and a first decryption key for decrypting data encrypted by the first encryption key, installs the first decryption key in the semiconductor device, and generates the first decryption key to the user side,
wherein the user side generates a second encryption key different from the first encryption key, and a second decryption key for decrypting data encrypted by the second encryption key, encrypts, by the second encryption key, data to be installed in the semiconductor device, and supplies the encrypted data to the provider side,
wherein the provider side encrypts the supplied data by the first encryption key without decryption, and supplies, to the user side, the data encrypted by the first encryption key,
wherein the user side decrypts the supplied data using the second decryption key, and installs the decrypted supplied data in the semiconductor device, and
wherein the semiconductor device decrypts the installed data using the first decryption key installed on the provider side.

2. The cryptosystem according to claim 1,
wherein the semiconductor device includes:
a first storage unit in which the first decryption key is to be installed;
a second storage unit in which data decrypted by the second decryption key is to be installed, the second storage unit being different from the first storage unit; and
a processing unit configured to decrypt the data by the first decryption key installed in the first storage unit, the data being installed in the second storage unit.

3. The cryptosystem according to claim 2,
wherein the data decrypted by the processing unit is a key on the user side, the key being for use at a time of a cryptographic communication.

4. The cryptosystem according to claim 2,
wherein the user side includes a factory configured to manufacture a product that incorporates the semiconductor device, and in the factory, in the second storage unit, installs the data decrypted by the second decryption key.

5. The cryptosystem according to claim 2,
wherein the data decrypted by the processing unit is coordinate data that specifies a point in a predetermined elliptic curve, and a parameter of the predetermined elliptic curve is shared in advance between the provider side and the user side.

6. A cryptographic service method for installing a key on a user side in a semiconductor device provided by a provider side, the methods comprising:
causing the provider side to generate a first encryption key, and a first decryption key corresponding to the first encryption key, to install the first decryption key in the semiconductor device, and to provide the user side with the first decryption key;
causing the user side to generate a second encryption key different from the first encryption key, and a second decryption key corresponding to the second encryption key, to encrypt the key on the user side by the second encryption key, and to supply the encrypted key to the provider side;
causing the provider side to encrypt the supplied key by the first encryption key without decryption, and to supply, to the user side, the encrypted key on the user side;
causing the user side to decrypt the supplied key on the user side using the second decryption key, and to install the decrypted supplied key in the semiconductor device; and
causing the semiconductor device to decrypt the installed key using the first decryption key.

7. The cryptographic service methods according to claim 6,
wherein the semiconductor device includes:
a first storage unit in which the first decryption key is to be installed;
a second storage unit in which the key on the user side decrypted by the second decryption key is to be installed, the second storage unit being different from the first storage unit; and
a processing unit configured to decrypt the key by the first decryption key installed in the first storage unit, the key being installed in the second storage unit.

8. The cryptographic service methods according to claim 7,
wherein the user side includes a factory configured to manufacture a product that incorporates the semiconductor device, and in the factory, in the second storage unit, installs the key on the user side, the key being decrypted by the second decryption key.

* * * * *